United States Patent [19]

Rumpf

[11] 4,083,512
[45] Apr. 11, 1978

[54] INDEPENDENT REDUNDANT CLUTCHLESS RETRACTOR

[75] Inventor: Robert John Rumpf, Grosse Pointe, Mich.

[73] Assignee: The Firestone Tire & Rubber Company, Akron, Ohio

[21] Appl. No.: 673,350

[22] Filed: Apr. 2, 1976

[51] Int. Cl.[2] ..................... A62B 35/02; B65H 75/48
[52] U.S. Cl. ....................... 242/107.4 A; 242/107.4 B
[58] Field of Search ................. 242/107.4 A, 107.4 B; 280/744–747; 297/388

[56] References Cited

U.S. PATENT DOCUMENTS

| | | | |
|---|---|---|---|
| 3,482,799 | 12/1969 | Wrighton et al. | 242/107.4 B |
| 3,897,024 | 7/1975 | Takada | 242/107.4 B |
| 3,907,227 | 9/1975 | Takada | 242/107.4 B |
| 3,917,189 | 11/1975 | Bryll | 242/107.4 B |
| 3,918,658 | 11/1975 | Beller | 242/107.4 B X |
| 3,923,269 | 12/1975 | Kell | 242/107.4 A |
| 3,941,330 | 3/1976 | Ulrich | 242/107.4 B X |

*Primary Examiner*—Harvey C. Hornsby
*Assistant Examiner*—John M. Jillions

*Attorney, Agent, or Firm*—Miller, Morriss and Pappas

[57] ABSTRACT

A safety belt retractor having a pair of actuating means which are independently responsive or condition sensitive to acceleration of webbing withdrawal and to ominidirectional acceleration or deceleration of the vehicle. The condition sensed first actuates a pilot pawl and the pilot pawl mechanically and positively engages means which drive the locking pawl to prevent webbing withdrawal from the webbing drum or reel. The pilot pawl is cam activated by the relative movement between a flywheel and the shaft of the drum or reel as is sensed by sudden withdrawal force on the webbing, or upon relative delay of rotation or lag in the flywheel consequent to inertial displacement of a pendulum and following pawl to ratchet engagement with the flywheel. The locking force of pilot pawl to drive the ratchet and the locking force to drive the pendulum pawl to the flywheel ratchet is minimal and the locking thrust of the lock pawl to the ratchet drum is by emergency stress felt on the harness or webbing and conveyed into the retractor frame and vehicle. The pendulum is miniaturized and the actuator mechanism is predominantly formed from precision molded resin parts.

9 Claims, 8 Drawing Figures

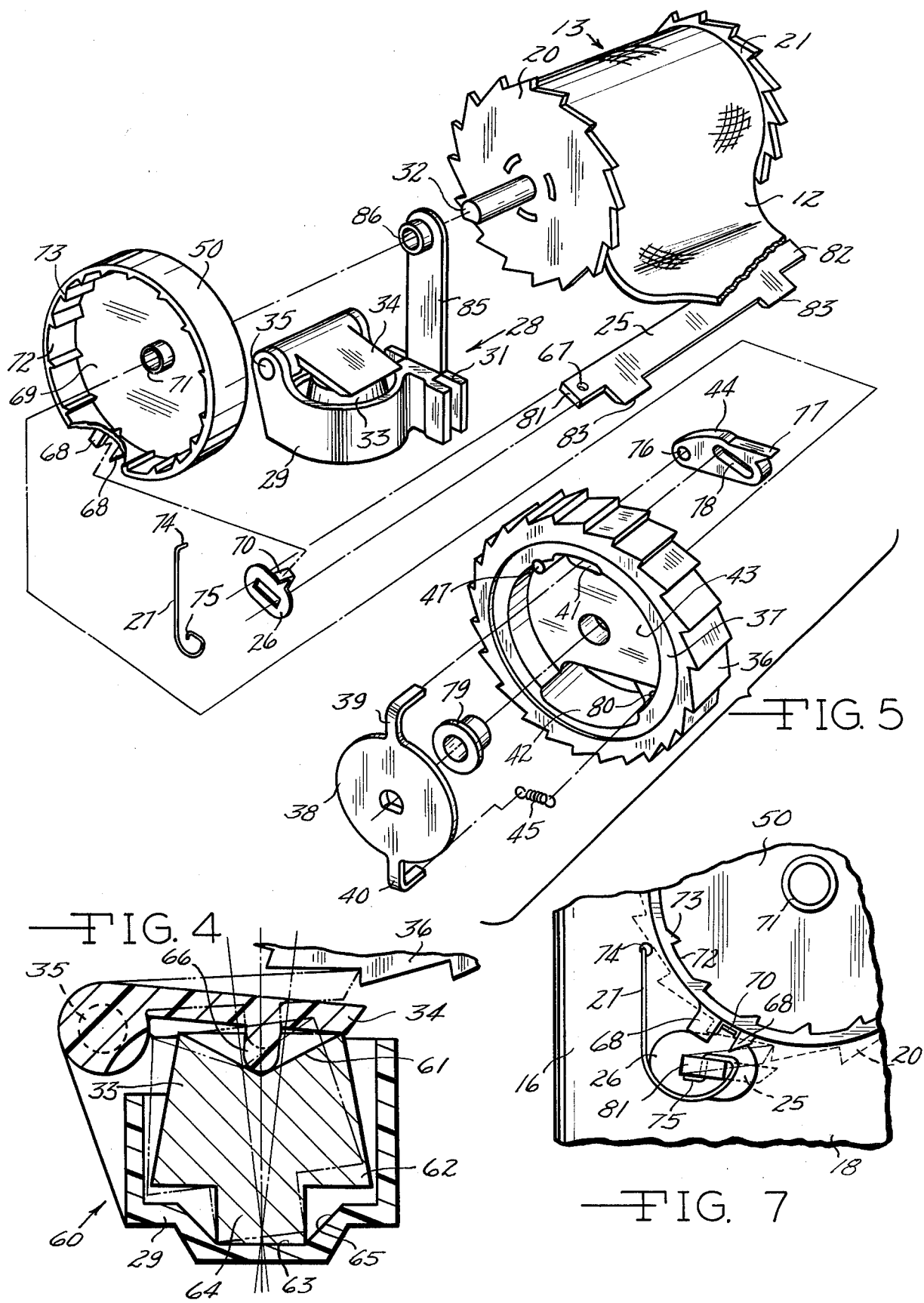

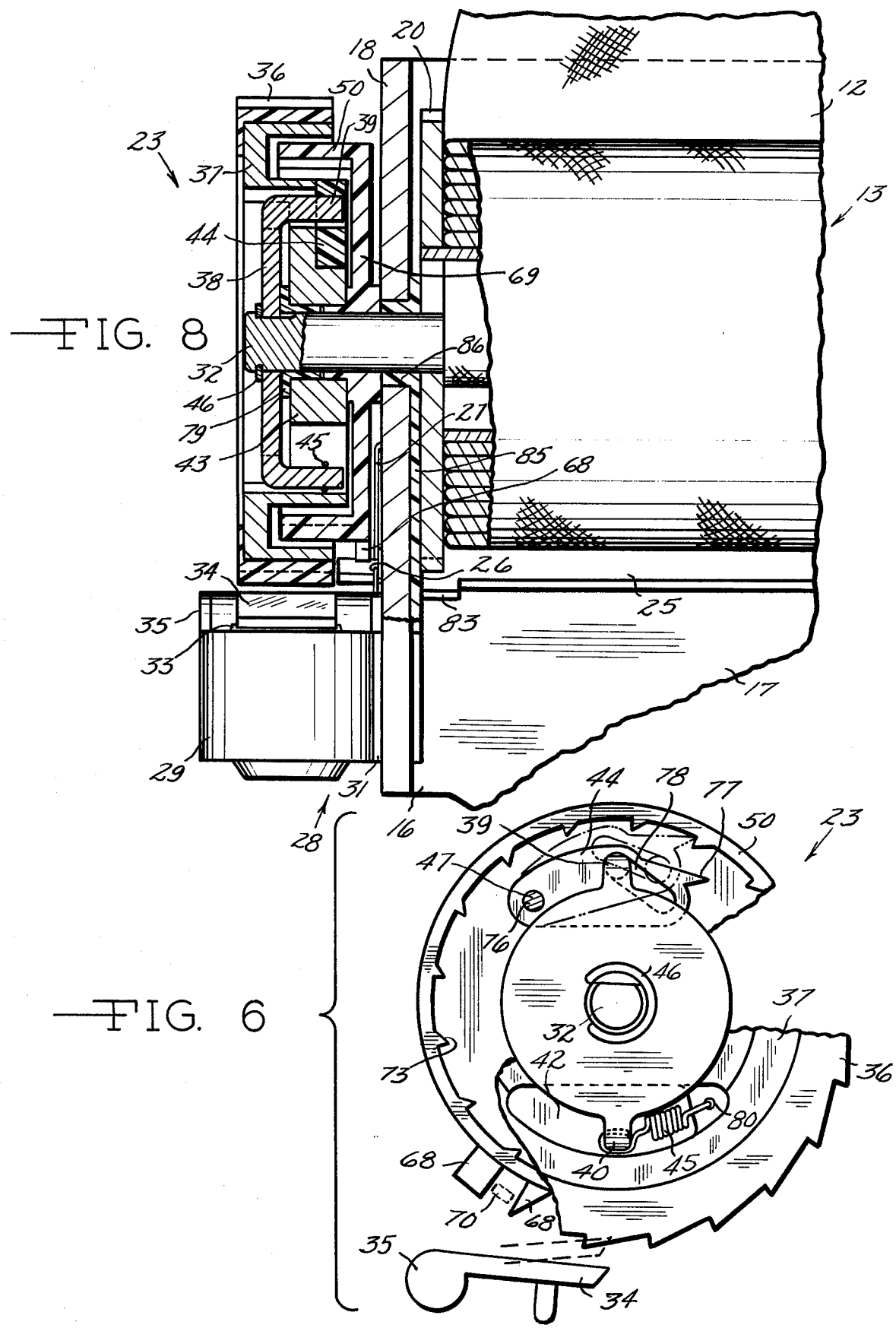

INDEPENDENT REDUNDANT CLUTCHLESS RETRACTOR

The present invention is an independent redundant and compact clutchless retractor in which positive drive engagement of pawls to ratchets (which are concentrically and nestably disposed in respect to each other) on the shaft results in a motion coordinated movement of the lock pawl to ratchet drum. This achieves a positive locking of the retractor against withdrawal of webbing when omnidirectional inertial imbalance is felt in the movement or position of the vehicle in which the retractor is placed or when sudden withdrawal accelerates the relative speed of the retractor shaft to flywheel. The relative lag of the flywheel is sensed by a shaft driven pilot pawl and the pilot pawl engages a lock drive inner ratchet drum which reacts positively to tilt the lock pawl into engagement with the ratchet flanges on the reel or drum and thereby locks the webbing. As the sensed condition abates and the tension on the webbing is relaxed surplus webbing is spooled on the drum by the retractor. The locking against withdrawal is achieved in a positive manner without use of a clutch having slippage and the coordination of pawl to teeth in drive of the pawl bar assures repetitive pawl entry to the ratchet tooth in contrast to chance bounce of pawl to tooth which occurs in prior known clutch type structures. This is the consequence of geometry in which the drum flange ratchet has the same number of teeth as the internal ratchet which drives the pawl bar.

The Prior Art

In the prior art two distinct types of inertial retractors have been well developed. The pendulum type vehicle sensitive retractor in either unidirectional or omnidirectional style are well known and generally comprise structures in which the displacement of a mass or pendulum from normal vertical hanging position causes a movement of a pawl and the pawl engages a ratchet driven by the drum or reel of the retractor. These are known as vehicle-sensitive retractors. A second type of inertial retractor relies upon relative imbalance as between the driven shaft of the retractor drum on withdrawal of webbing and an inertial mass or flywheel so that as displacement occurs consequent to the relative imbalance, a clutch tilts a pawl or locking lug into interference relation with teeth on a ratchet wheel. Some of these devices are centrifugal relying on a relative radial displacement for the actuation of a clutch. This second type of inertial retractor is called "webbing sensitive" since the acceleration of rotation of the reel shaft is responsive to sudden withdrawal of webbing as occurs when the user is suddenly cast against the harness or webbing as in an impact accident or sudden stop. In Europe it has been fairly common to combine the function of these devices and such structures are reasonably well represented in the U.S. art as in Kell U.S. Letters Pat. No. 3,905,562, in Stephenson U.S. Letters Pat. No. 3,858,824 and in Lindblad U.S. Letters Pat. No. 3,779,479. Simple and direct combinations of such features were seen also in the U.S. Letters Pat. No. 3,446,454 and 3,489,367 to Kovacs et al.

The present invention goes beyond the prior art to achieve a positive locking of the webbing drum against withdrawal of webbing in which a group of concentric ratchets are interlocked drivably by a pilot pawl acted upon by a cam and the cam movement occurring because of the relative displacement between a flywheel or inertial rotating element and a member driven by the drum. The displacement may also occur by holding or stopping the flywheel, as will be seen.

Another object is to achieve the above objective in a structure which is compact as by miniaturization of the pendulum and nesting of elements and wherein the entire mechanism for redundant locking actuation occupies no more space than existing automatic locking retractor mechanisms. This object is the consequence of reducing the force necessary from the sensors and the shielding of the sensing mechanisms from the ultimate lock stresses.

Still another object is to achieve redundant actuation in a positive and coordinated manner in avoidance of pawl bounce either in the pilot pawl or the lock pawl so that relatively light resin materials may be used throughout the sensing mechanisms and only the lock pawl feels the lock up stresses of forces on the webbing transmitted through the drum and lock pawl and into the frame and thence to the vehicle.

Another object is to achieve synchronization of lock bar movement with the drum ratchet so that the bar always enters the ratchet between teeth under positive drive in avoidance of chance bounce.

Other objectives including structural simplicity and integration of complexes of parts with advantages in assembly and economic production will be appreciated by those skilled in the art as the description proceeds.

GENERAL DESCRIPTION

The seat belt retractor or the present invention is a drum receptacle for harness webbing and is used in vehicles for the comfort, protection, safety and convenience of the users of the vehicles, both drivers and passengers. For example, the webbing or cable stored on the reel or drum may be withdrawn and coupled by buckles or other hardware to other portions of harness to form selected shoulder and lap supports which under emergency conditions restrains the body of the user from being projected against the vehicle. The drum on which the webbing is wound is spring loaded or biased to rewind and the drum is provided with ratchet wheels. By blocking the ratchet wheels, as by a pawl, the withdrawal of webbing is prevented. The drum is fastened to a shaft and the shaft is connected at one end to the coiled retractor spring or motor. The other end of the shaft axially supports the lock-up mechanism comprising a pair of concentric and nested ratchet elements functioning to lock in different directions and both free on the shaft. The two ratchets are selectively locked together when a pilot pawl intermediate the two ratchets is activated. The pawl is pivoted from the outermost of the two concentric ratchets (the flywheel) and is pivotal therefrom. A drive spider is connected to the shaft (hence turns with the shaft) and extends through the outer ratchet web. One leg of the spider is in camming relation to the pilot pawl element. The other leg of the spider is connected by a spring to the outer concentric ratchet. The outer concentric ratchet is weighted in the manner of a flywheel and lost motion slots in the web of the flywheel-ratchet allow relative movement between the spider or shaft and the flywheel. As relative displacement occurs, the spider cams the pilot pawl outward into engagement with the inner nested ratchet and the motion causes positive drive of the inner ratchet with the outer ratchet. The spring drags the flywheel around with the spider and if acceleration of the shaft occurs, the spider runs ahead of the flywheel and the camming of the pilot pawl occurs with consequent driving of the concentric inner ratchet and this results in limited rotation of the inner ratchet and projections extending radially therefrom and consequent tilting movement of a lock pawl bar into blocking engagement with the ratchet flanges on the webbing spool or drum. Since the number of teeth on the inner ratchet and the ratchet flanges of the drum are equal, the entry of the lock pawl bar to the ratchet flange teeth is a drive entry and the pawl always enters between teeth in avoidance of pawl bounce by the selection of the tilting geometry of the lock bar moved by the inner ratchet. A relatively small omnidirectionally sensitive pendulum is beneath the flywheel-ratchet. The pendulum element is a one-piece body in a resin case. Above the mass comprising the pendulum is a lever arm pivoted from the pendulum case with a feeler tip extending vertically into an upper concavity in the pendulum mass. As the mass shifts the lever is raised and it impinges on the ratchet perimeter of the flywheel so that the flywheel is arrested and relative displacement occurs as between flywheel and spider. The displacement cams the pilot pawl outwardly blocking the inner ratchet and the movement of the drum causes rotating of the case of the inner ratchet to move the lock pawl lever and the lock pawl. The lock pawl is biased out of engagement with the ratchets on the drum by reason of a light spring. The arrangement or geometry of the teeth in the inner ratchet and the ratchet flanges of the drum is such that the mechanical and geometric consequence of movement of the inner ratchet tilts the lock pawl bar and it precisely enters the root or pocket between ratchet teeth and the motion of the lock pawl is thereupon a driven positive motion imparted by the action of the retractor or drum in answer to the pull on the webbing. The teeth on the inner ratchet are directionally opposed to the teeth on the ratchet flanges of the drum but are equal in number.

No slip clutch structure is employed and as a consequence of this construction, the pilot pawl, the inner ratchet, the outer ratchet (except for weighted web portion), the pendulum lever, and the pendulum cage, saddle and bearings are all of lightweight resin obeying the smallest of forces and hence allowing reduction of the size of the pendulum mass and consequent miniaturization. The locking force is a positive driving force camming from drum movement acting on the pawl bar which positively seats the pawl at a frequency or speed to assure entry between the ratchet teeth. Suitable journalling is provided in support of the shaft and to assure smooth and relatively friction-free movement of the drum and shaft in respect to the concentric inner and outer ratchets. The device of the present invention allows reduction in weight, simplicity in construction and assembly, and excellent repetitive accuracy.

IN THE DRAWINGS

FIG. 4 is an enlarged expanded fragmental view of the pendulum cage and pendulum with pivotal latch in the tilt and untilt positions to stop the motion of the outer ratchet-flywheel against the very light spring drag of the spider thereby allowing the pivoted lever or latch to be made from injection molded resin and the pendulum cage to be similarly precision manufactured.

FIG. 5 is an exploded assembly related perspective view of the drum assembly, integral bearing saddle and cage, inner ratchet, lock pawl lever, lock pawl bar, camming pawl, outer flywheel-ratchet, drive spider, bearing and springs.

FIG. 6 is a fragmented and enlarged partially cutaway view of the concentric inner and outer ratchets as interrelated by the drive spider keyed on the shaft and camming the pilot pawl to engage the teeth of the inner ratchet. The relative location of the pendulum lever is indicated in respect to the outer ratchet and the inner ratchet carries the lock pawl actuator lever dogs which tilt the lock pawl bar upon rotation of the inner ratchet.

FIG. 7 is a fragmental and partial end elevation view showing the lock pawl bar in the pawl bar lever and the post of the lever bracketed by the actuator lever dogs which are moved with the inner ratchet to lock the ratchet wheels of the drum in prevention of further webbing withdrawal.

FIG. 8 is a full section front elevation view of the actuating mechanism of the present invention and fragmentally showing the frame, drum and ratchet flange thereof and indicating the nesting of concentric ratchets to keep the profile low.

SPECIFIC DESCRIPTION

Figure 1:
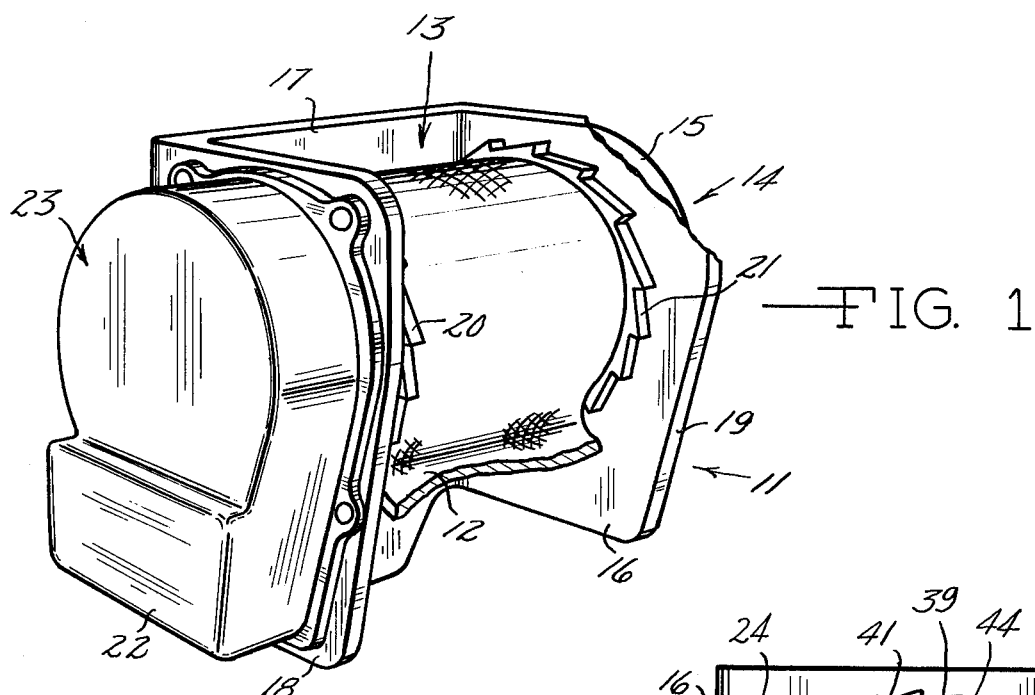
FIG. 1 is a perspective view of a retractor in accord with the present invention in its relative installed position and with a cover over the locking mechanism housing the redundant locking features.

Referring to the drawings and with first particularity to the FIG. 1 thereof, a retractor 11, in accord with the present invention, is shown and oriented in its normal position of use in a vehicle (not shown). The retractor 11 is redundant, locking against accelerated withdrawal of belt webbing or harness 12 from the drum 13 and locking when the vehicle impacts or stops suddenly. The retractor 11 includes a rewind spring motor 14 which, as is well known in the art, applies a rewind or return bias to the drum 13. Since the rewind motor 14 is well known, the details of its construction are felt unnecessary to a full appreciation of the present invention. The motor 14 usually comprises a flat coiled spring keyed at the inner end to the shaft of the drum 13 and supported by the case or cover 15 and the frame 16 at the other end. The frame 16 is channel shaped as shown and comprises the integral web floor 17 and leg portions 18 and 19. Between the legs 18 and 19 the drum or reel 13 is supported or journalled. The drum 13 is connected (as will be seen) to a shaft and the harness belt or webbing 21 is wound thereon between the ratchet wheel flanges 20 and 21. A resin protective cover 22 is secured over the sensor mechanism 23 which is located within the cover adjacent and outboard of the leg 18 of the frame 16.

Figure 2:
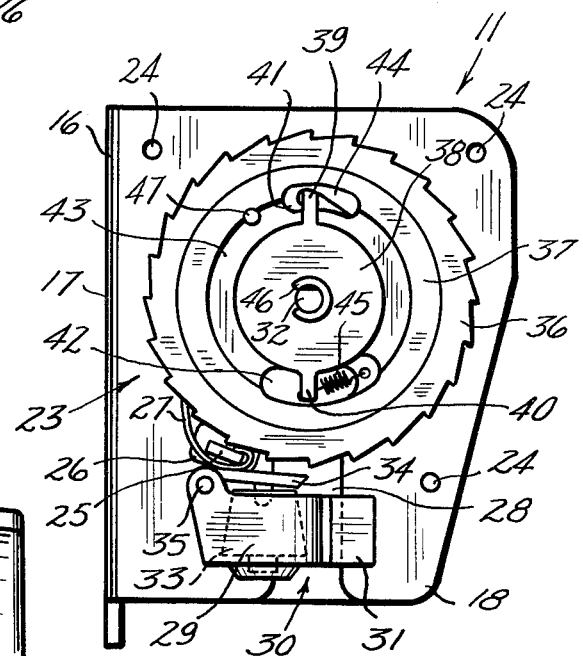
FIG. 2 is a side elevation view of the retractor seen in FIG. 1 but with the mechanism cover removed to illustrate the simplicity and compactness of the mechanism and the miniaturization of the pendulum structure.

In FIG. 2 the cover 22 has been removed and the sensor mechanism 23 is revealed. Integral legs of the snap-bifurcated type or other fasteners not a part of the present invention pass through the openings 24 through the frame leg 18 and may be integral or non-integral with the protective cover 22 to secure the cover 22 in place. A lock pawl bar 25 extends through the wall of the leg 18 and one of the end extensions of the pawl bar 25 is embraced by an actuating lever 26. The actuating lever 26 is plate-like with a drive dog rising transversely therefrom. The lever 26 is keyed or configured to embrace the end of the lock bar pawl 25 and movement of the lever 26 correspondingly tilts the lock bar pawl 25. As the lever 26 is moved, the pawl bar 25 is tilted. The spring 27 acting between frame 16 and bar 25 biases the pawl bar 25 and lever 26 to an unlocked position as will be seen. A journal saddle 28 integral with the pendulum support cage 29 is located in a slot 30 in the leg 18 by the channel flaps or flanges 31 and is supported from a journal portion embracing (as will be seen) the shaft 32. This support assures dimensional indexing of the saddle 28 and consequently the cage 29. The pendulum mass 33 (erect in the vertical position) is nested in the pendulum cage 29. The lever 34 on pivot 35 tilts in following engagement with the top of the mass 33. The lever 34, cage 29 and saddle 28 are all precision fabricated as by injection molding from plastic or resin material selected for good mechanical strength, good dimensional stability, good bearing quality, and low weight as for example, polypropylene or a resin sold by E. I. duPont de Nemours and Company under the trademark or tradename, Delrin.

The free tip of the lever 34 is aligned to engage, upon tilting, the teeth on outer ratchet wheel 36 and the outer ratchet wheel 36 is secured as by a friction fit (sufficient friction to exceed the strength of spring 45) on the perimeter of the flywheel 37. Keyed or fastened to the shaft 32 so as to be driven thereby is the drive spider 38 with legs 39 and 40. The legs 39 and 40 extend through the arcuate clearance openings 41 and 42 transversely through the web 43 of the ratchet-flywheel 36–37. The leg 39 of the drive spider 38 extends to camming relation with a pilot pawl 44. The leg 40 is secured by the tension spring 45 to the ratchet-flywheel 36–37 so that as the belt webbing or harness 12 is withdrawn as shown in FIG. 1, the spring 45 urges the ratchet-flywheel 36–37 to follow the movement of the spider 38 and if there is a sudden acceleration of the shaft 32 from accelerated withdrawal forces on the belt webbing 12, then the ratchet-flywheel 36–37 lags behind the spider 38 and the leg 39 of the spider 38 moves relative to the flywheel 37 (permitted by arcuate openings 42 and 43) as shown in a clockwise direction and urging the pilot pawl 44 radially outward. As will be seen, this same phenomena is observable when the pendulum following lever 34 arrests movement of the outer ratchet wheel 36. These phenomena, as will be seen, result in a coordinated movement of the lock pawl bar 25. The web or floor 17 of the frame 16 includes mounting provisions for clamping or securing the retractor 11 to the structural parts of the vehicle (not shown) so that the pendulum 33 is normally erect in vertical position in the cage 29. As will be appreciated, the configuration of the frame 16 may be adjusted to suit particular mounting problems and the webbing 12 can be trained over suitable passages or bars to remote use orientation. The snap ring 46 secures the assembly on the shaft 32 (as shown) from axial displacement and the pin 47, as will be seen, is a pivotal support for the pilot pawl 44.

Figure 3:
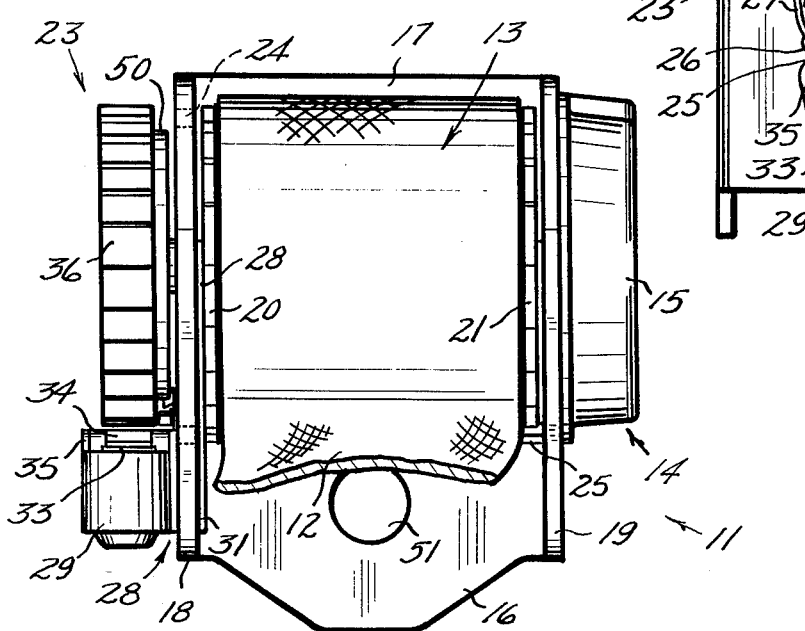
FIG. 3 is a front elevation view of the retractor structure of the present invention as seen in FIG. 2 with the mechanism cover removed and illustrating the nesting of concentric ratchet structures.

In FIG. 3 the structure of FIG. 2 is best appreciated so that the minimal extension in an axial direction is appreciated as resulting in a highly compact structure and the inner ratchet 50 is visible substantially nested in the inboard perimeter of the outer ratchet 36. The mounting opening 51 through the floor or web 17 of the frame 16 is visible and the pawl lock bar 25 is seen extending between the legs 18 and 19 of the frame 16 to selectively and tiltably lock and block the withdrawal rotation of the drum 13 at the ratchet wheel flanges 20 and 21.

Referring to FIG. 4, the miniature pendulum structure can be best appreciated. It is this pendulum structure 60 which renders the structure of the present invention vehicle sensitive. The pendulum 33 is a metal high specific gravity mass such as brass, bronze, lead, iron or the like and which has a conic concavity 61 at the top and which bells outwardly toward a base skirt 62 and the mass or pendulum 33 is symmetric on the vertical axis, as shown, unless displaced. The cage 29 is of resin material such as a polypropylene which has an internal clearance allowing the tilting of the mass 33 off of the horizontal base 63 at the end of the short stem 64. The base 63 is urged by the dished configuration 65 of the bottom of the cage 29 to the vertical position. As shown by the phantom lines any sudden inertial imbalance as by abrupt braking or stopping causes the pendulum 33 to tilt in the cage 29 and in doing so effectively raises the effective center of the concavity 61 and raises the lever 34 on the pivot 35. The depending dimple or protrusion 66 which is integral with the lever 34 rests in the concavity 61 and in the vertical position of the pendulum mass 33, the dimple 66 rests on the axis of the mass. As the mass 33 tilts from omnidirectional imbalance of inertial forces such as a sudden application of brakes, the lever 34 pivots as the dimple 66 follows the upward motion of the conic wall of the concavity 61. As the lever 34 raises it engages the outer ratchet 36 of the ratchet-flywheel 36–37 and arrests its rotation thereby achieving a relative movement between the spider 38 or shaft 32 and the flywheel 37. As will be seen, this relative motion moves the pilot pawl 44 in the inner ratchet and pivoted on the pin 47 (in opening 76 of pilot pawl 44) of the outer ratchet to result in ultimate and coordinated blocking or locking of the pawl bar 25 against the teeth of the ratchet wheels 20 and 21 of the drum 13 and in prevention of the further withdrawal of harness webbing 12.

In FIG. 5 the assembly relationship is best comprehended and the inner ratchet 50 is best appreciated to achieve by limited movement the tilting of the pawl bar 25 by the positive rotating displacement of the lever 26 by the spaced-apart radial extensions 68 from the base or web 69 of the inner ratchet structure 50. Hence, as the inner ratchet 50 rotates, the radial extensions 68 rotate and embrace between them the drive dog 70 of the lever 26. The position of the radial extensions 68 astraddle the drive dog 70 is selected so that movement of the inner ratchet 50 obeys the rotation of the drum 13 and the pawl bar 25 engages the ratchets 20 and 21 between the teeth thereof. In general, the inner ratchet 50 is cup shaped as shown and is free at the bearing 71 on the shaft 32. The disc shaped base 69 is surrounded by an integral flange 72 which includes the integral ratchet teeth 73 geometrically opposite to the sense of the teeth in outer ratchet 36 and the ratchet flanges 20 and 21 on the drum 13. The pawl 44 impinges on the teeth 73 in the inner ratchet 50 under the inertial influence of accelerated webbing withdrawal or vehicle sensing of inertial imbalance imparted to the pawl 44 by relative differential movement between the outer ratchet 36 and the spider 38 driven by the shaft 32. The number of teeth in the inner ratchet 50 equals the number of teeth in each of the ratchet flanges 20 and 21 of the drum 13. In the units tested, 15 and 16 tooth ratchets were employed with good results. The spring 27 is attached at end 74 to the leg 18 of the frame 16 (FIG. 7) and the end 75 is connected to the pawl bar 25 at the opening 67 therethrough. This biases the lock pawl bar 25 to a position out of engagement with the ratchet wheel flanges 21 and 20 of the drum 13 and provides sufficient minimal resistance to any frictional tendencies of the inner ratchet 50 to move. This is because the dog 70 on the lever 26 is held in the pawl bar 25 inactive position. The inner ratchet 50 nests in a perimeter groove in the flywheel-ratchet 37-36 structure and the pilot pawl 44 is pivotally supported on the pin 47 in a cavity between the inner and outer ratchets 50 and 36, respectively. The opening 76 provides an easy running fit on the projection of the pin 47 and the movement of the pilot pawl 44 on the pin 47 gives the tooth 77 a sufficient travel to block the ratchet teeth 73 of the inner ratchet 50. However, the movement of the pawl 44 on the pin 47 is determined by the camming action of the leg 39 of the drive spider 38 which extends through the ramped cam slot 78 in the pilot pawl 44. The leg 39 of spider 38 thus imparts a positive cam drive force to the pilot pawl 44 when relative separation occurs between the speed of the spider 38 and the flywheel-ratchet 37-36. This occurs when the pendulum lever 34 is elevated by sensed inertial imbalance to engage and arrest the outer ratchet 36 and when sudden acceleration of the shaft 32 drives the spider 38 ahead of the flywheel 37. The grommet bearing 79 rests on the shaft 32 and supports the free running flywheel 37 on the shaft 32 and separates the drive spider 38 from frictional drag on the flywheel 37. Thus the spider 38 on withdrawal of webbing 12 from the drum 13 pulls the flywheel 37 with it by means of the energy storing spring 45 secured at opening 80 to the flywheel 37 and to the leg 40 of the spider 38. The pawl bar 25 is of flat metal and is poised on the frame 16 at the tab extensions 81 and 82 in arcuate slots (not shown) in the legs 18 and 19 so as to allow the pawl teeth 83 to tilt into and out of ratchet engagement with the registering wheels 20 and 21 of the drum 13.

In FIG. 6 the nesting of the outer ratchet 36 and flywheel 37 to enclose the inner ratchet 50 and the functioning of the positive drive mechanism 23 in coordination with two sensed inertial forces is best appreciated. The pendulum lever 34 is seen to be displaceable to arrest motion of the flywheel-ratchet 37-36 and when the drive spider 38 is moving with the shaft 32, the spring 45 is elongated and the leg 39 of the spider 38 is rotated and the leg 39 in the diagonal slot 78 cams the pawl 44 outwardly as previously described to engage and drive the inner ratchet 50 in a clockwise direction with the spider 38 as shown, thus rotating the lever moving extensions 68 of the inner ratchet 50 and locking the webbing 12 against withdrawal when the pawl bar engages the ratchet wheels 20 and 21 of the drum 13. The extensions 68 as previously described assure timing of the entry of the pawl lock bar 25 between the teeth of the ratchet flanges 20 and 21. The camming action in the slot 78 of the pilot pawl 44 is clearly seen and the consequent displacement of the pilot pawl is shown in phantomline. The same camming occurs when there is a sudden accelerated withdrawal of webbing because then the spider 38 leads the trailing flywheel 37.

By reference to FIG. 7 the consequence of clockwise rotation of the inner ratchet 50 is best expressed since the inner ratchet 50 moves the dog 70 by reason of the corresponding movement of the radial extensions 68 and this tilts the plate-like lever 26 and the firmly grasped pawl bar 25 against the light return bias of the spring 27.

In the FIG. 8, by enlargement, the compactness of this redundant positive drive inertial retractor mechanism 23 is best appreciated with its miniaturized pendulum structure 33 in support cage 29 and the upstanding arm 85 of the saddle 28 is shown best with the integral bearing portion 86 on the shaft 32 in journalling relation and with the flanges 31 in support of the integral cage 29 by sandwich impingement on the leg 18 of the frame 16.

As shown, no resistance is imposed to retraction of webbing 12 by the motor 14. The pawls 44, 25 and the lever 34 are disabled in prevention of retraction unless, of course, there is tension in the webbing 12. When retraction occurs and tension on the webbing 12 is relieved, the springs 27 and 45 bias the structure to normalcy when the lever 34 is allowed to return by the restoration of verticality in the pendulum 33. The structure thus described is adjustable in sensitivity and the structure functions well under extended testing which subjects the structure to alternating vehicular sensed inertial imbalance and accelerated webbing withdrawal. The extensive use of resin parts has greatly reduced bulk. The use of resin in previously inertia sensitive levers and pawls provides assurances against false sensing by the parts themselves avoiding inertial forces by reduction in specific gravity. This also reduces the force required to sensitize the system and allows very small pendulum masses and consequent miniaturization. The use of the pilot pawl and the geometry of the ratchets to each other and the movement of one ratchet to impart lock forces assures a positive drive and proper pawl to tooth entry in the structure. All of this in reference to a pawl bar lock-up results in a superior and simpler redundant locking inertial retractor as can be appreciated by those skilled in the art.

Having thus described an operative preferred embodiment of the invention, those skilled in the art will readily perceive obvious changes, modifications, and improvements therein within the spirit of the invention and such changes, modifications and improvements are intended to be included herein limited only by the scope of the hereinafter appended claims.

I claim:

1. An inertial retractor mechanism for safety belt webbing, having a bias to rewind, the structure for drivably locking said retractor against withdrawal comprising:
   a frame;
   a webbing drum having ratchet end flanges journalled in said frame;
   a lock bar pawl in said frame in tiltable lock relation to said ratchet end flanges;
   a flywheel having a clearance opening and a recess;
   a pilot pawl pivoted on said flywheel and including a positive drive connection to said drum through said clearance opening in said flywheel;
   an inner faced ratchet in independent rotational relation to said flywheel located in said recess of said flywheel and coaxial therewith, said inner faced ratchet including drive projections connected to said lock bar and said inner faced ratchet in engageable register with said pilot pawl, said inner faced ratchet having an equal number of teeth to the teeth on said ratchet end flanges of said drum;

means resiliently connecting said flywheel to said drum for rotation therewith whereby upon lagging in rotation of said flywheel relative to said drum, said pilot pawl is driven by said positive drive connection into engagement with said inner faced ratchet, and said lock pawl bar is tilted, by rotation of said inner faced ratchet, into locking engagement with said ratchet end flanges.

2. In the combination of claim 1 wherein a cam provides said positive drive connection between said drum and said pilot pawl.

3. In the combination of claim 2 wherein said flywheel includes an outer faced ratchet and wherein a pendulum means is positioned beneath said flywheel in registrable engageable lock relation with said flywheel ratchet.

4. An inertial retractor mechanism, having a bias to rewind, the structure for drivably locking said retractor against withdrawal comprising:

a frame;

a retractor drum having ratchet flanges rotatable in said frame;

a lock bar pawl in said frame biased against engagement with said ratchet flanges and tiltable toward engagement with said ratchet flanges;

an inner faced ratchet engageable with said lock bar pawl and having oppositely oriented teeth from said ratchet flanges on said drum;

a pilot pawl pivotally moveable toward and away from lock engagement with said inner faced ratchet;

a drive spider concentric with said drum and said inner ratchet and having a drive dog in camming relation to said pilot pawl and drivably connected to said drum;

a flywheel resiliently connected to said drive spider and in which said spider is nested and said inner faced ratchet is concentrically positioned, said spider driven by said drum and said spider resiliently driving said flywheel and said pilot pawl, upon accelerated withdrawal of webbing from said drum, and said pawl thereupon drivably engaging said inner faced ratchet; and a pendulum positioned adjacent said flywheel and selectively moveable by inertial forces to engage said flywheel, delaying rotation of said flywheel, whereby said spider moves said pawl and said pawl engages said inner faced ratchet locking said drum by tilting said pawl bar into engagement with said ratchet flange of said drum.

5. In the combination set out in claim 4 wherein said pendulum is suspended in a saddle and cage structure; and journal supports integrally extending from said saddle and cage structure in support of said drum and secured to said frame against lateral and rotational displacement.

6. In the combination of claim 4 wherein said inner faced ratchet includes a pair of spaced-apart radial projections, said projections from said inner faced ratchet drivably connected to said lock bar pawl whereby movement of said inner faced ratchet moves said lock bar pawl to lockably engage said ratchet flange of said drum.

7. In the combination of claim 4 and including a pair of spaced-apart radial projections drivably connected to said lock bar pawl and the teeth on said inner ratchet are equal in number to the teeth in said ratchet flanges of said drum and said radial projections are positioned to positively drive said lock bar pawl between adjacent of said teeth on said ratchet flanges.

8. An inertial retractor for safety belt webbing, having a bias to rewind, the structure for drivably locking said retractor against withdrawal comprising:

a frame;

a retractor drum biased to rewind safety belt webbing thereon and including a pair of matched spaced-apart ratchet flanges;

a shaft axially secured to said drum and rotatable therewith and journalled in said frame;

a drive spider secured to one end of said shaft and rotating with said shaft;

a flywheel freely rotatable on said shaft and having an outer ratchet face, a pair of arcuate openings therethrough and a pivot pin through said flywheel in an axis parallel and offset from said shaft;

a spring connecting said flywheel drivably to said spider;

a pilot pawl pivotally mounted on said pilot pin and including a cam slot engaged with said spider;

an inner faced ratchet member free on said shaft and having internal teeth in opposed direction to said flywheel outer ratchet and said ratchet flanges on said drum and in concentric relation within said flywheel and said pilot pawl on said flywheel in engageable register with said internal teeth and said inner faced ratchet member including a pair of spaced-apart radial projections;

a saddle element having a journal portion embracing said shaft, a pair of spaced-apart integral frame supporting and position orienting flanges, and an integral cage portion;

a lever pivotally supported by said cage portion;

a pendulum mass supported by said saddle and in said cage portion of said saddle, said pendulum mass in following engagement with said lever;

a pawl lock bar in said frame and in tiltable locking register with said ratchet flanges and biased out of contact with said flanges; and a drive dog operably connected to said pawl lock bar and extending between said radial projections from said inner faced ratchet member whereby movement of said inner faced ratchet member by cam activation of said pilot pawl causes locking of said drum against withdrawal of said webbing therefrom.

9. An inertial retractor for safety belt webbing, having a bias to rewind, a webbing drum with ratchet flanges in a support frame, and lock bar tiltable on said frame toward and away from said ratchet flanges, the structure for drivably locking said retractor against withdrawal comprising:

a drive spider drivably connected to said drum and having legs;

a flywheel rotatable on the axis of said drum and resiliently drivable by said spider in a withdrawal rotation of said drum and axially and internally engaged with said spider on one side, said flywheel having a pivotal support extending to the other side and said flywheel having a pair of arcuate slots therethrough whereby said leg extensions of said spider project and said flywheel having a perimeter ratchet surface;

a pilot pawl pivotally connected to said flywheel at said pivotal support of said flywheel, said pilot pawl including a cam slot through which one of said legs of said drive spider is connected;

resilient means connecting said other of said legs of said spider with said flywheel;

an inner faced ratchet element coaxially in said flywheel and enclosing said pilot pawl, said pilot pawl pivotal to engage said inner faced ratchet element and said inner faced ratchet element including a pair of spaced-apart radial projections, said projections operably embracing said lock pawl bar and upon movement of said inner faced ratchet element under withdrawal of said webbing, said lock pawl bar is urged toward said ratchet flanges of said drum; and pendulum inertial means secured to said frame and extendable to arrest said flywheel in the withdrawal direction of rotation.

* * * * *

UNITED STATES PATENT OFFICE
CERTIFICATE OF CORRECTION

Patent No. 4,083,512  Dated 1978 April 11

Inventor(s)  Robert John Rumpf

It is certified that error appears in the above-identified patent and that said Letters Patent are hereby corrected as shown below:

In the Abstract, line 4, "ominidirectional" should read
--- omnidirectional ---

Column 2, line 32, change "or" to read --- of ---

Column 4, line 56, change "21" to read --- 12 ---

Column 10, line 21, change "pilot" second occurrence to read
-- pivot --.

Column 12, line 8, after "rotation" insert --- by engagement with the ratchet surface of said flywheel ---

Signed and Sealed this

Twelfth Day of September 1978

[SEAL]

*Attest:*

RUTH C. MASON
*Attesting Officer*

DONALD W. BANNER
*Commissioner of Patents and Trademarks*